(12) United States Patent
Ma (10) Patent No.: US 10,616,400 B2
(45) Date of Patent: Apr. 7, 2020

(54) METHOD FOR CONTROLLING TERMINAL DEVICE, TERMINAL DEVICE, AND WEARABLE DEVICE THEREOF

(71) Applicant: Lenovo (Beijing) Co., Ltd., Beijing (CN)

(72) Inventor: Wenchao Ma, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 10 days.

(21) Appl. No.: 15/680,574

(22) Filed: Aug. 18, 2017

(65) Prior Publication Data
US 2018/0054513 A1 Feb. 22, 2018

(30) Foreign Application Priority Data
Aug. 18, 2016 (CN) .......................... 2016 1 0687140

(51) Int. Cl.
| | |
|---|---|
| H04M 1/725 | (2006.01) |
| H04M 1/67 | (2006.01) |
| H04W 76/14 | (2018.01) |
| H04W 4/80 | (2018.01) |
| H04W 12/06 | (2009.01) |
| H04W 12/00 | (2009.01) |

(52) U.S. Cl.
CPC ......... *H04M 1/72577* (2013.01); *H04M 1/67* (2013.01); *H04M 1/72569* (2013.01); *H04W 4/80* (2018.02); *H04W 12/06* (2013.01); *H04W 76/14* (2018.02); *H04M 1/7253* (2013.01); *H04W 12/00508* (2019.01)

(58) Field of Classification Search
USPC ........................................................ 455/557
See application file for complete search history.

(56) References Cited

U.S. PATENT DOCUMENTS

| | | | | |
|---|---|---|---|---|
| 2002/0107054 | A1* | 8/2002 | Fujisawa | G04G 21/04 455/573 |
| 2013/0316746 | A1* | 11/2013 | Miller | H04L 51/30 455/466 |
| 2014/0325614 | A1* | 10/2014 | Rhelimi | H04W 12/06 726/4 |
| 2015/0161377 | A1* | 6/2015 | Rodzevski | G06F 21/35 726/18 |
| 2016/0027399 | A1* | 1/2016 | Wilde | G06F 13/382 345/520 |

(Continued)

FOREIGN PATENT DOCUMENTS

| | | |
|---|---|---|
| CN | 104536561 A | 4/2015 |
| CN | 104615240 A | 5/2015 |

(Continued)

*Primary Examiner* — Ganiyu A Hanidu
(74) *Attorney, Agent, or Firm* — Anova Law Group, PLLC (57) ABSTRACT

The present disclosure provides a control method of a terminal device and a wearable device, a terminal device, and a wearable device thereof. The control method of a terminal device includes receiving first information transmitted from a wearable device, the terminal device being in a first state, and the first information being related to data detected by the wearable device; determining second information, the second information being related to an input detected by the terminal device; and switching the terminal device to a second state if the first information corresponds to the second information.

14 Claims, 5 Drawing Sheets

(56) References Cited

U.S. PATENT DOCUMENTS

| | | | | |
|---|---|---|---|---|
| 2016/0035213 A1* | 2/2016 | Choi | ..................... | H04L 63/107 |
| | | | | 340/669 |
| 2016/0036965 A1* | 2/2016 | Kim | ....................... | H04W 4/70 |
| | | | | 455/411 |
| 2016/0253651 A1* | 9/2016 | Park | ....................... | G07F 9/023 |
| | | | | 705/39 |
| 2016/0342781 A1* | 11/2016 | Jeon | ....................... | G06F 21/32 |
| 2017/0185808 A1* | 6/2017 | Zhang | .................... | G06F 21/84 |
| 2017/0337542 A1* | 11/2017 | Kim | ....................... | G06F 3/041 |

FOREIGN PATENT DOCUMENTS

| | | | |
|---|---|---|---|
| CN | 104991721 A | 10/2015 | |
| CN | 105100395 A | 11/2015 | |
| CN | 105159666 A | 12/2015 | |

\* cited by examiner

100

Detecting, by a terminal device, an input after the terminal device establishes a connection with a wearable device and the terminal device is in a first state — 110

Receiving, by the terminal device, first information transmitted from the wearable device, wherein the first information is used to characterize a first data detected by the wearable device — 120

Determining, by the terminal device, second information, wherein the second information is used to characterize a first input detected by the terminal device — 130

Determining, by the terminal device, whether the first information matches the second information — 140

Switching the terminal device to a second state if the first information matches the second information, wherein the terminal device has different authorities to access data between the first state and the second state — 150

Receiving, by a wearable device, an instruction message sent by a terminal device, wherein the indication message is used to instruct the wearable device to start detection of input, or the instruction message is used to instruct the wearable device to transmit an information for characterizing data detected by the wearable device to the terminal device ⟶ 210

Sending, by the wearable device, a first information to the terminal device, wherein the first information is used to characterize the data detected by the wearable device so that the terminal device switches a state according to the first information ⟶ 220

METHOD FOR CONTROLLING TERMINAL DEVICE, TERMINAL DEVICE, AND WEARABLE DEVICE THEREOF

CROSS-REFERENCES TO RELATED APPLICATIONS

This application claims priority of Chinese Patent Application No. 201610687140.X, filed on Aug. 18, 2016, which is incorporated by reference in its entirety.

FIELD OF THE INVENTION

The present disclosure generally relates to the field of electronic device technology and, more particularly, relates to a control method of a terminal device and a wearable device, a terminal device, and a wearable device thereof.

BACKGROUND

With the development of science and technology, functions of mobile phones have become more powerful. Users also use mobile phones more frequently. In order to prevent privacy leaks and erroneous operations, mobile phones usually enter a locked state when not used. In that case, users need to perform an unlocking operation to unlock the mobile phones before use.

The current unlocking methods of mobile phones often include password unlocking, gesture unlocking (or pattern unlocking), and fingerprint unlocking. Password unlocking or gesture locking requires users to memorize preset passwords or gestures, and enter passwords or gestures to perform an unlocking operation in a preset area of mobile phones. Such operations are more complex and not convenient. Fingerprint unlocking instead requires a specific finger to touch a fingerprint area of mobile phones. It is also not convenient.

Thus, operations in the prior art to switch mobile phones from a screen-locked state to an unlocking state is quite complicated.

BRIEF SUMMARY OF THE DISCLOSURE

In view of the foregoing, the present disclosure provides a control method of a terminal device and a wearable device, a terminal device and a wearable device, the control method of which facilitates the terminal device to perform a state switch.

One aspect of the present disclosure provides a control method of a terminal device. The control method includes receiving first information transmitted from a wearable device, the terminal device being in a first state, and the first information being related to data detected by the wearable device; determining second information, the second information being related to an input detected by the terminal device; and switching the terminal device to a second state if the first information corresponds to the second information.

The method further includes determining whether an action characterized by the first information corresponds to the second information.

The method further includes determining whether the first information including a time at which the wearable device detects the data; and determining whether the time is within a threshold value and whether the action characterized by the first information corresponds to the second information.

Further, the data detected by the wearable device and the input detected by the terminal device are from different types of sensors.

The method further includes determining whether the first information corresponds to the second information based on a correspondence between the data detected by the wearable device and the input detected by the terminal device.

The method further includes sending a message to the wearable device, wherein the message instructs the wearable device to start detection of an input, or to send the first information to the terminal device.

The method further includes sending a message to stop detection of the input after the terminal device receives the first information transmitted from the wearable device.

The method further includes detecting an input when the terminal device is not connected with the wearable device, the terminal device being in the first state; determining third information, the third information being related to a second input detected by the terminal device; determining whether the third information corresponds to an authentication information; and switching the terminal device to the second state if the third information corresponds to the authentication information.

Another aspect of the present disclosure provides a control method of a wearable device. The control method of a wearable device comprises: getting connected with a terminal device, the terminal device being in a first state; receiving a message from the terminal device, the message instructing the wearable device to start detection of an input, or to send first information to the terminal device, the first information being related to data detected by the wearable device; and sending the first information to the terminal device so that the terminal device is switched to a second state according to the first information.

Further, the first information further comprises a time at which the wearable device detects the input.

Still another aspect of the present disclosure provides a terminal device. The terminal device, includes a sensor configured to detect an input after the terminal device establishes a connection with a wearable device, the terminal device being in a first state; a transceiver configured to receive first information transmitted from the wearable device, the first information being related to data detected by the wearable device; and a processor. The processor is configured to: determine second information, the second information characterizing an input detected by the terminal device; determine whether the first information corresponds to the second information; and switch the terminal device to a second state if the first information corresponds to the second information.

Further, the processor is further configured to determine whether an action characterized by the first information corresponds to the second information.

Further, the sensor of the terminal device is different from a sensor for detecting the data in the wearable device.

Further, the sensor of the terminal device is further configured to detect an input when the terminal device is not connected with the wearable device, the terminal device being in the first state. The processor is further configured to determine third information, the third information characterizing a second input detected by the sensor; determine whether the third information matches an authentication information; and switch the terminal device to the second state if the third information corresponding to the authentication information.

Further, the transceiver is further configured to establish a connection with the wearable device.

Another aspect of the present disclosure provides a wearable device. The wearable device includes a sensor configured to detect an input and a transceiver configured to receive a message transmitted by a terminal device, the message instructing the wearable device to start detection of an input, or to send information for characterizing data detected by the wearable device to the terminal device. The transceiver is further configured to send first information to the terminal device, the first information characterizing the data detected by the wearable device indicating the terminal device is being switched to a state according to the first information. The transceiver is further configured to establish a connection with the terminal device.

According to the foregoing technical solutions, consistent with the present disclosure, the terminal device detects an input after the terminal device and the wearable device establishes a connection and the terminal device is in a first state. The terminal device receives first information sent by the wearable device for characterizing data detected by the wearable device. The terminal device determines second information for characterizing an input detected by the terminal device itself. If the first information matches the second information, the terminal device is switched to a second state. In such an arrangement, the user is not required to input a preset password or a complete unlocking gesture. It may not require the user's finger to touch a fingerprint detection area, either. Embodiments of the present disclosure accordingly facilitate the terminal device to perform a state switch, thereby enhancing the user's experience.

BRIEF DESCRIPTION OF THE DRAWINGS

In order to more clearly illustrate the technical aspects of the present disclosure, the following drawings, used in the embodiments of the present disclosure, will be briefly described. It will be apparent for those skilled in the art that the drawings described below are merely some embodiments of the present disclosure. That is, the following drawings are merely examples for illustrative purposes according to various disclosed embodiments and are not intended to limit the scope of the present disclosure in any sense.

DETAILED DESCRIPTION

Detailed descriptions and technical contents according to embodiments of the present disclosure will be described in conjunction with the accompanying drawings shown below. Wherever possible, the same reference numbers will be used throughout the drawings to refer to the same or like parts. It is apparent that the described embodiments are parts of the present disclosure, not all of them. All other embodiments obtained by those of ordinary skill in the art without departing from the inventive work of the present disclosure are intended to be within the scope of the present disclosure, based on embodiments thereof.

The terms of "first", "second", "third" and the like in the specification, claim and drawings of the present disclosure are used to distinguish different elements and not to describe a particular order.

In the disclosed embodiments, a terminal device includes, but is not limited to, a mobile phone, a notebook computer, a tablet computer, a portable device and so forth. And a wearable device includes, but is not limited to, a wristband device, a smart watch, a smart hand ring, a smart headband and so forth.

Figure 1:
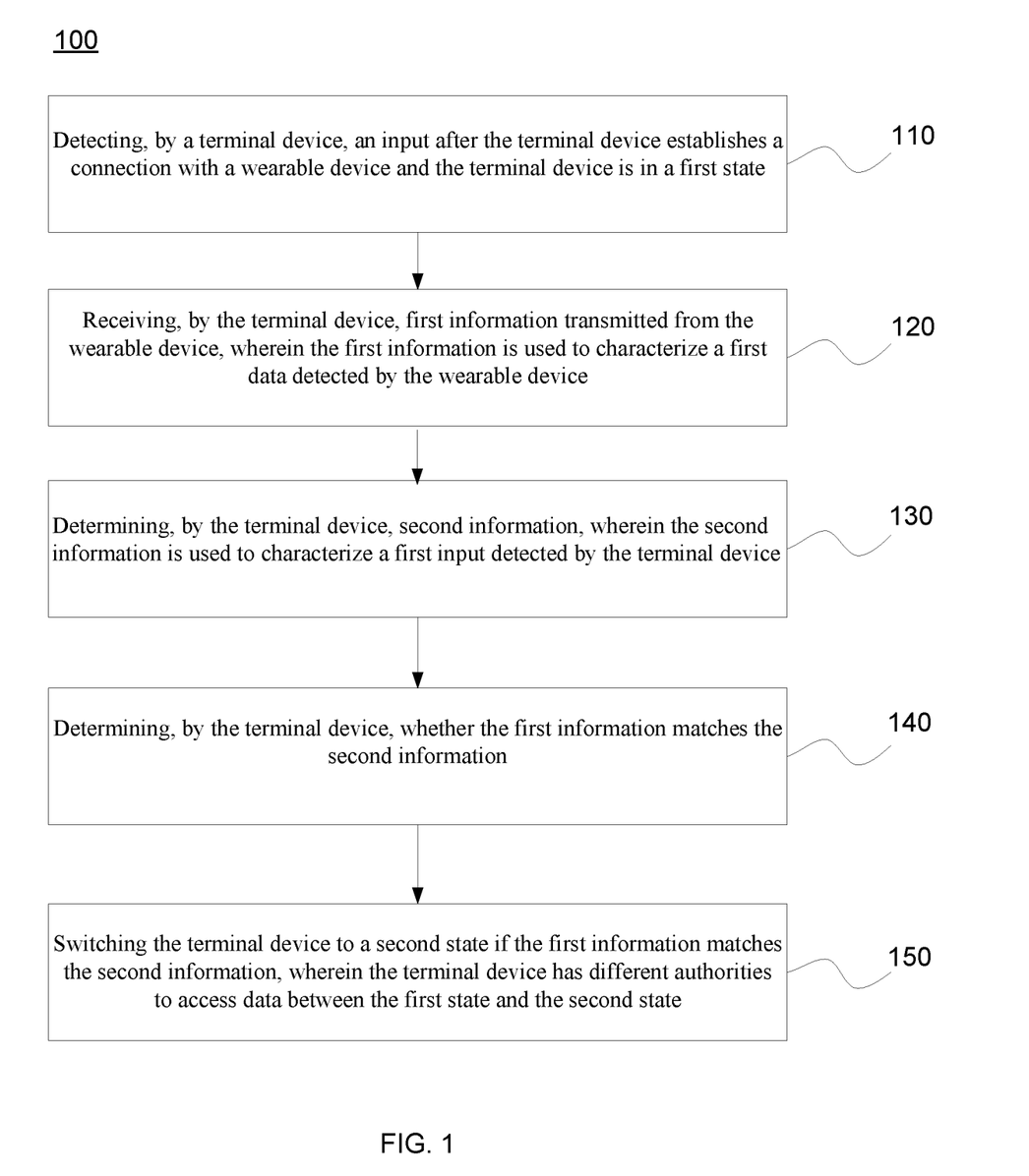
FIG. 1 illustrates a schematic flow diagram of a control method of a terminal device consistent with one embodiment of the present disclosures.

FIG. 1 illustrates a flow diagram of a control method 100 of a terminal device consistent with one embodiment of the present disclosure. As shown, the control method 100 comprises:

110: Detecting, by the terminal device, an input after the terminal device establishes a connection with a wearable device and the terminal device is in a first state.

120: Receiving, by the terminal device, first information transmitted from the wearable device, wherein the first information is used to characterize a first data detected by the wearable device.

The first data as mentioned above can be an input data detected by the wearable device.

130: Determining, by the terminal device, second information, wherein the second information characterizes a first input detected by the terminal device.

140: Determining, by the terminal device, whether the first information corresponds to the second information.

150: Switching the terminal device to a second state if the first information corresponds to the second information. The terminal device has different authorities to access data in the first state and the second state.

Optionally, if the first information and the second information do not match, the terminal device is maintained in the first state and prompts the user that switching state is not successful.

In one instance, the first state may be a screen-locked state, while the second state may be an unlocked state. Alternatively, the first state can be a state to verify data, while the second state can be an authentication-success state. Or, the first state can be a document-locked state, while the second state can be a document-unlock state and so forth.

In one embodiment of the present disclosure, the terminal device detects an input after the terminal device is connected with the wearable device and the terminal device is in the first state. The terminal device receives first information transmitted from the wearable device for characterizing a data detected by the wearable device. The terminal device determines the second information for characterizing an input detected by the terminal device. If the first information matches the second information, the terminal device is switched to a second state. In such an arrangement, the user does not need to input a pre-determined password or unlocking gesture in the terminal device. Embodiments of the present disclosure do not require the user's finger to touch a fingerprint detection area, either. Accordingly, the terminal device easily performs the operation of switching a state, thereby improving the user's experience.

When the same user is using a wearable device and a terminal device, the wearable device and the terminal device may determine an action of the same body part of the user, or an action of the associated body parts of the user. In one instance, the wearable device and the terminal device can both detect heart beats. Or, the terminal device can detect the user's hand action and the wearable device can determine the hand action by detecting the user's arm muscle movements. Therefore, in some embodiments, if inputs detected by the wearable device and the terminal device may correspond to each other; the wearable device and the terminal device are used by one user. And the state of the terminal device is switched. Embodiments of the present disclosure can therefore ensure the terminal device is unlocked in the user's sight, thus improving safety performance of the terminal device.

Optionally, in step 140, determining, by the terminal device, whether the first information matches the second information may include the terminal device determining whether an action of a user characterized by the first information corresponds with the first input.

A user can perform the action using a body part, such as a hand, a finger, an arm, the heart or so forth. The action of the user characterized by the first information can refer to a shaking of the hand, a touch operation of the finger on the touchscreen of the terminal device, the beatings of the heart or so forth.

For instance, both the terminal device and the wearable device may detect the user's hand action or the beatings of the heart, etc. If the terminal device determines an action of the body part detected by itself matches an action of the body part detected by the wearable device, the terminal device may automatically switch its state.

Optionally, the action of the user characterized by the first information matching the first input, may include: the first data characterized by the first information and the first input characterized by the second information correspond to the same user. In other words, if the user corresponding to the input detected by the terminal device and the user corresponding to the data detected by the wearable device are identical, the terminal device may automatically switch its state.

Optionally, the action of the user characterized by the first information matches the first input, may include: the first data characterized by the first information and the first input characterized by the second information correspond to the same user, and the action of the user characterized by the first data and at least a part of characteristics or parameters of the action of the user characterized by the first input are the same. In other words, if the user corresponding to the input detected by the terminal device and the user corresponding to the data detected by the wearable device are identical, and at least a part of characteristics and parameters of the action detected by the terminal device and the wearable device respectively are the same, the terminal device may automatically switch the state. In such an arrangement, the safety performance of the terminal device can be improved.

In some embodiments, the action of the user characterized by the first data and the action of the user characterized by the first input are the same. For instance, when the user holds the terminal device by hand and shakes the arm, the terminal device and the wearable device detect the same arm-shaking action. Or, when the user's finger enters a gesture on the touchscreen of the terminal device, the terminal device and the wearable device detect the same user's gesture.

In some embodiments, the duration of the action of the user characterized by the first data coincides with the action duration of the same user characterized by the first input. For instance, when the user holds the terminal device by hand and shakes the arm, the terminal device and the wearable device detect in the same time duration of the user's arm shaking.

In some embodiments, the number of the user characterized by the first data is the same as the number of the user characterized by the first input. For instance, when the user applies two fingers sliding on the touchscreen of the terminal device, the wearable device detects the action of the user's two fingers, while the terminal device detects two contacts on the touchscreen.

Optionally, the first information further includes a time at which the wearable device detects the first data. Correspondingly, the determining, by the terminal device, whether an action of the user characterized by the first information matches the first input, may comprise: determining, by the terminal device, whether the action of the user characterized by the first information occurs within the time threshold; and further determining, by the terminal device, whether the action of the user characterized by the first information matches the first input if the action of the user characterized by the first information occurs within the time.

In one embodiment of the present disclosure, the terminal device may determine whether the action of the user characterized by the first information occurs within the time at which the wearable device detects the first data. Accordingly, it is determined that the terminal device and the wearable device are simultaneously used by the user and the safety performance of the terminal device can be further improved.

Optionally, the first data and the first input may be detected by different types of sensors. For instance, the first data in the wearable device is detected by a biometric sensor (e.g., an electromyography sensor), while the first input in the terminal device is detected by a touch/image sensor (e.g., a touch screen or a camera).

It should be noted that the first data and the first input can also be detected by the same type of sensors. In one instance, the first data in the wearable device and the first input in the terminal device may both be detected by a heart rate sensor.

In some embodiments, the wearable device may be a wristband device. The first data can be detected by a sensor in the wearable device for detecting an arm muscle movement. The first input is detected by a sensor in the terminal device for a hand action. It should be noted that the wearable device can store the corresponding relationship between the arm muscle movements and the hand action in advance. After the wearable device detects the arm muscle movements, the hand action can be determined according to the corresponding relationship.

In some embodiments, the wearable device may be a wristband device. The first information transmitted by the wristband device is information about the hand action determined by the wristband device. The terminal device can compare the information of the hand action transmitted by the wristband device with the input detected by the terminal device itself.

In some embodiments, the wearable device may be a wristband device. The first information transmitted by the wristband device is data of the arm muscle movements detected by the wristband device. The terminal device can store the corresponding relationship between the hand action and the data of the muscle movement in advance. And the terminal device determines the hand action based on the pre-stored corresponding relationship to determine whether the hand action matches the input detected by the terminal device itself.

Optionally, the determining, by the terminal device, whether the first information corresponds to the second information, may comprise: determining, by the terminal device, whether the first information matches the second information based on the pre-stored corresponding relationship between information for characterizing the first data and information for characterizing the first input.

For example, the wearable device may be a wristband device. The wristband device sends the first information which is arm muscle movement data detected by the wristband device. The terminal device may further store the corresponding relationship between the data of the arm muscle movements and the information for characterizing the hand action in advance. The terminal device determines whether the first information transmitted by the wristband device matches the second information determined by the terminal device itself based on the pre-stored corresponding relationship.

In an embodiment of the present disclosure, the terminal device stores the corresponding relationship between the information for characterizing the first data and the information for characterizing the first input. Such an arrangement facilitates the step of determining whether the first information matches the second information.

Optionally, the method as illustrated in FIG. 1 further comprises: sending, by the terminal device, a message to the wearable device after the terminal device is connected with the wearable and the terminal device is in the first state, wherein the message instructs the wearable device to start detection of an input.

Optionally, the method as illustrated in FIG. 1 further comprises: sending, by the terminal device, a message to the wearable device after the terminal device is connected with the wearable and the terminal device is in the first state. The message instructs the wearable device to send, to the terminal device, information for characterizing data detected by the wearable device.

Optionally, the method as illustrated in FIG. 1 further comprises: stopping detection of input, by the terminal device, after the terminal device receives the first information transmitted by the wearable device. In some embodiments, the terminal device can stop detection of input after a preset condition is satisfied. The preset condition may be stored in the terminal device in advance.

For instance, the terminal device can send a message to stop detection of input after detecting an input that satisfies a preset condition. The detected input satisfies the preset condition that the shaking amplitude of a hand may be greater than a threshold, or the sliding distance of a finger is greater than a threshold.

In another instance, the terminal device can also stop detection of input after a time of input detection reaches a preset time duration.

Optionally, the method shown in FIG. 1 further comprises: detecting, by the terminal device, an input when the terminal device is not connected with the wearable device and the terminal device is in the first state; determining, by the terminal device, a third information, wherein the third information characterizes a second input detected by the terminal device; determining, by the terminal device, whether the third information matches a pre-stored authentication information; and switching the terminal device to the second state if the third information matches the pre-stored authentication information.

The third information may be a preset gesture, a password, a fingerprint input, or the like. In one embodiment of the present disclosure, when the terminal device is not connected with the wearable device, the terminal device may determine whether or not to perform a state switch based on a preset input.

Figure 2:
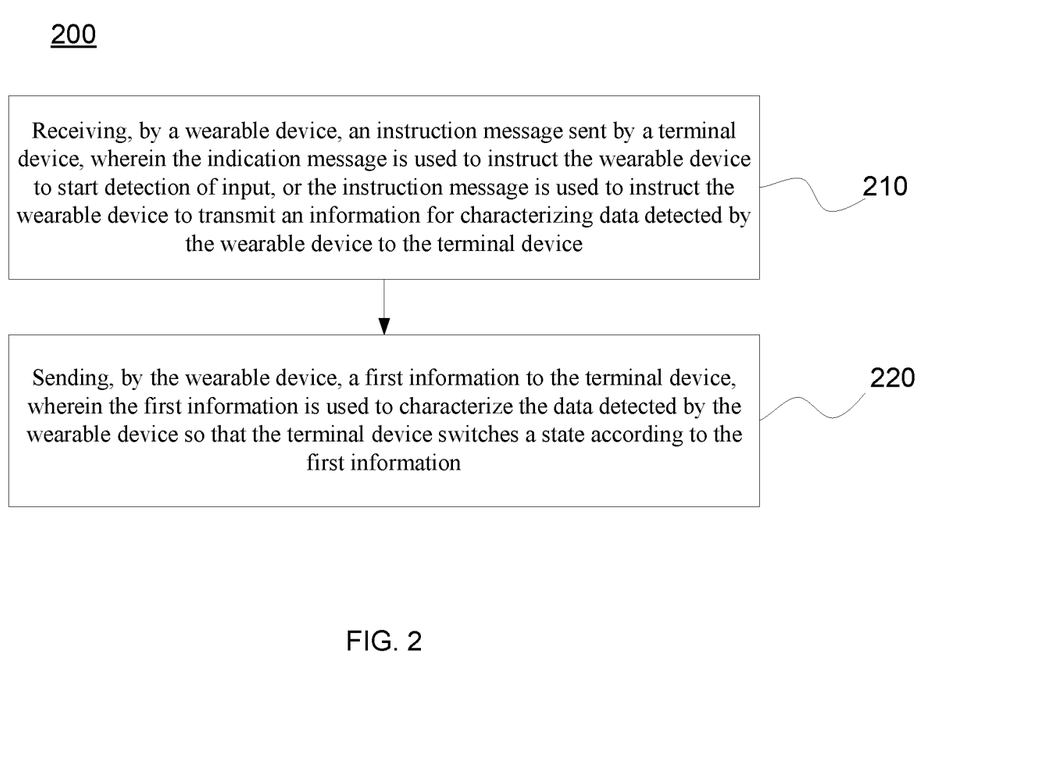
FIG. 2 illustrates a schematic flow diagram of a control method of a terminal device consistent with another embodiment of the present disclosure.

FIG. 2 is a schematic flow diagram of a control method 200 of a terminal device according to another embodiment of the present disclosure. As shown in FIG. 2, the control method 200 comprises:

210: Receiving, by a wearable device, a message sent by a terminal device, wherein the indication message is used to instruct the wearable device to start detection of an input, or the message is used to instruct the wearable device to transmit information for characterizing data detected by the wearable device to the terminal device.

220: Sending, by the wearable device, first information to the terminal device, wherein the first information is used to characterize the data detected by the wearable device so that the terminal device switches a state according to the first information.

In one embodiment of the present disclosure, the wearable device transmits the information for characterizing the data detected by the wearable device to the terminal device based on the message send from the terminal device, so that the terminal device switches a state according to the information. In such an arrangement, the user does not need to input a preset password or an unlocking gesture in the terminal device, neither does a user's finger needs to contact the fingerprint detection region. The terminal device can easily perform a state switch operation, thereby improving the user's experience.

In some embodiments, the wearable device starts detection of input based on the message sent by the terminal device. Correspondingly, the wearable device may stop detection of input after a preset condition is satisfied. The present condition may be stored in the wearable device in advance, or may be contained in the message sent by the terminal device.

In one instance, the wearable device may stop detection of input if the detected input satisfies the preset condition, such as the detected input satisfies the preset condition that the shaking amplitude of a hand may be greater than the threshold, or the sliding distance of a finger is greater than the threshold.

In another instance, the terminal device may also stop detection of input after a time of detection reaches a time duration.

In some embodiments, the wearable device may detect input in real time, and the first information transmitted by the wearable device to the terminal device may be used to characterize the data detected within a period of time after the wearable device receives the message.

In one example, the first information may be used to characterize the data detected within a preset time period after the wearable device receives the message. The preset time period may be stored in the wearable device in advance or may be contained in the message.

In another instance, the first information may be used to characterize the data detected within the period of time between the times at which the wearable device receives the message to the time at which the input detected by the wearable device satisfies a preset condition. The preset condition may be stored in the wearable device in advance, or contained in the message. For instance, the input detected by the wearable device satisfies a preset condition that the shaking amplitude of a hand may be greater than the threshold, or the sliding distance of a finger is greater than the threshold.

Optionally, the first information may further include a time at which the wearable device detects the data.

One embodiment of the present disclosure enables the terminal device to determine whether the state of the terminal device can be switched according to the time at which the wearable device detects the data, thereby ensuring that the terminal device and the wearable device are simultaneously used by the user to further enhance the safety performance of the terminal device.

Figure 3:
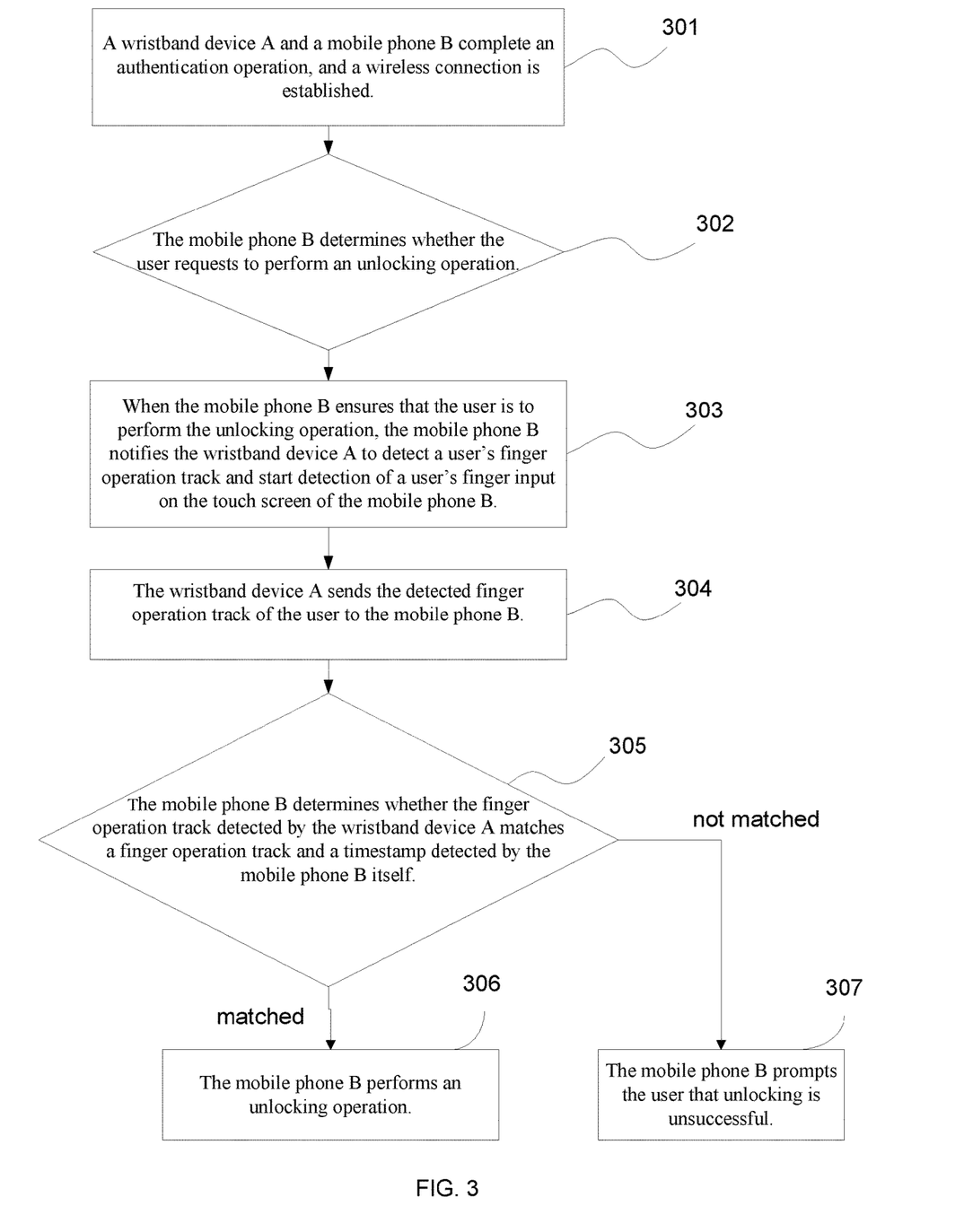
FIG. 3 illustrates a schematic flow diagram of a control method of a terminal device consistent with still another embodiment of the present disclosure.

FIG. 3 is schematic flow diagram of a control method of a terminal device according to still another embodiment of the present disclosure, in which a wristband device and a mobile phone are used as an example to describe the present disclosure.

301: A wristband device A and a mobile phone B complete an authentication operation. A wireless connection is established (such as Bluetooth).

It should be noted that, in some embodiments, if the user enters a password after the wristband device A is turned on and the wristband device A has not been removed, the user is not required to enter a password afterwards when using the wristband device A. That is, the wristband device A is in an unlock state.

302: The mobile phone B determines whether the user requests to perform an unlocking operation.

303: When the mobile phone B determines that the user is performing the unlocking operation, the mobile phone B notifies the wristband device A to detect a user's finger operation track and start detection of a user's finger input on the touch screen of the mobile phone B.

For instance, when the mobile phone B detects that the display is lit on and is in a screen-locked state, it is determined that the user is to perform the unlocking operation.

In some embodiments of the present disclosure, the wristband device A may be worn on a forearm of the user, and the wristband device A can determine the user's finger operation tracks based on detecting changes of the forearm muscles.

304: The wristband device A sends the detected finger operation track of the user to the mobile phone B.

Optionally, the wristband device A may send the detected finger operation track to the mobile phone B when it is detected that the user's finger has a sliding distance greater than a distance, such as a preset distance (e.g., 4 cm).

Optionally, the wristband device A may send the detected finger operation track to the mobile phone B when it is detected that a detection time exceeds a preset time duration (e.g., 2 s).

305: The mobile phone B determines whether the finger operation track detected by the wristband device A matches a finger operation track and a timestamp detected by the mobile phone B itself.

Optionally, the wristband device A may also send a timestamp for indicating the time at which the wristband device A detects the finger's operation track to the mobile phone B. Accordingly, the mobile phone B may determine whether the time at which the wristband device A detects the finger's operation tack matches the time at which the mobile phone B detects an operation track on itself.

306: If the finger operation track and the timestamp match, the mobile phone B performs an automatic unlocking operation.

307: If the finger operation track and the timestamp do not match, the mobile phone B prompts the user that unlocking is unsuccessful.

For example, the mobile phone B may show a message that an unlocking operation is not successful on the display, the mobile phone B may vibrate to indicate the user that an unlocking operation is not successful, or the mobile phone B may make a sound that an unlocking operation is not successful.

It should be noted that, in some embodiments, the wristband device A may also detect the number of fingers being operated in step 303. Accordingly, in step 304, the wristband device A sends the number of detected fingers to the mobile phone B. In step 305, the mobile phone B determines whether the number of fingers detected by the wristband device A matches the finger operation track detected by the mobile phone B itself. For instance, if the finger operation track detected by the mobile phone B is formed by moving two contacts on the touch screen and the number of fingers detected by the wristband device A is two, the input detected by the wristband device A matches the input detected by the mobile phone B.

Thus, in some embodiment of the present disclosure, the terminal device detects an input after the terminal device establishes a connection with the wearable device and the terminal device is in the first state. The terminal device receives the first information transmitted by the wearable device, wherein the first information characterizes the data detected by the wearable device. The terminal device further determines the second information, wherein the second information characterizes the input detected by the terminal device. If the first information matches the second information, the terminal device switches to the second state. In such an arrangement, the user does not need to input a preset password or unlocking gesture in the terminal device. It does not require the user's finger touching the fingerprint detection area, either. Accordingly, the terminal device can easily carry out a state switch, thereby improving the user's experience.

Figure 4:
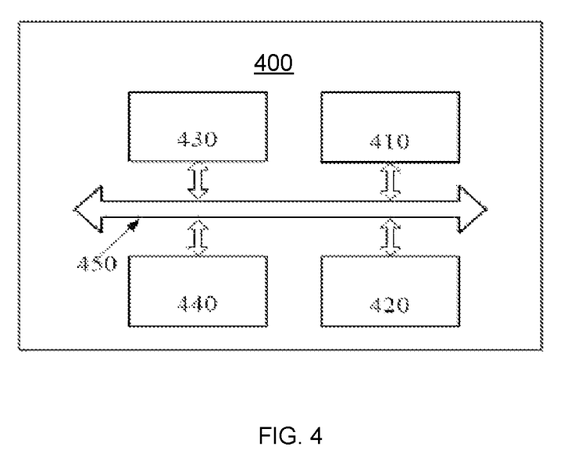
FIG. 4 illustrates a schematic structural diagram of a terminal device according to one embodiment of the present disclosure.

FIG. 4 is a schematic structural diagram of a terminal device consistent with the present disclosure. As illustrated in FIG. 4, the terminal device 400 comprises a processor 410, a memory 420, a transceiver 430, a sensor 440 and a bus system 450. The processor 410, the memory 420, the transceiver 430 and the sensor 440 are connected via the bus system 450. The memory 420 is configured to store instructions, while the processor 420 is configured to execute the instructions stored in the memory 420.

The sensor 440 is configured to detect an input after the terminal device is connected with the wearable device and the terminal device is in the first state. The transceiver 430 is configured to establish a connection with the wearable device and receive the first information transmitted by the wearable device, wherein the first information characterizes the first data detected by the wearable device.

The processor 410 is configured to: determine second information, the second information characterizing an input detected by the terminal device; determine whether the first information matches the second information; and switch the terminal device to a second state if the first information matches the second information. The terminal device has different authorities to access data in the first state and the second state.

In one embodiment of the present disclosure, the terminal device detects an input after the terminal device is connected to the wearable device and the terminal device is in the first state. The terminal device receives first information transmitted from the wearable device for characterizing a data detected by the wearable device. The terminal device then determines the second information for characterizing an input detected by the terminal device. If the first information matches the second information, the terminal device is switched to a second state. In such an arrangement, the user does not need to input a preset password or unlocking gesture in the terminal device. It may not require the user's finger touching a fingerprint detection area, either. Accordingly, the terminal device can easily perform a state switch, thereby improving the user's experience.

Optionally, the processor 410 may be further configured to determine whether an action of a user characterized by the first information matches the input detected by the first input. Optionally, the first information includes a time at which the wearable device detects the first data.

Accordingly, the processor 410 may be configured to determine whether the action of the operation occurs within the time; and, if the action of the user occurs within the time, further determine whether the action of the user characterized by the first information matches the first input detected by the terminal device.

Optionally, the sensor 440 may be different from a sensor for detecting the data in the wearable device. Optionally, the processor 410 may be further configured to determine whether the first information matches the second information according to a pre-stored corresponding relationship between information for characterizing the first data and information characterizing the first input.

Optionally, the transceiver 430 may be further configured to send a message to the wearable device after the terminal device is connected with the wearable device and the terminal device is in the first state. The message is sent to instruct the wearable device to start detection of an input.

Optionally, the transceiver 430 may be further configured to send a message to the wearable device after the terminal device is connected with the wearable device and the terminal device is in the first state. The message is sent to instruct the wearable device to send information for characterizing data detected by the wearable device to the terminal device. Optionally, the sensor 440 may be configured to stop detection of input after the first information sent by the wearable device is received.

Optionally, the sensor 440 may be also configured to detect an input before the terminal device is connected with the wearable device, wherein the terminal device is in the first state. Accordingly, the processor 410 is also configured to determine a third information, the third information characterizing a second input detected by the sensor 440; determine whether the third information matches a pre-stored authentication information; and switch the terminal device to the second state if the third information matches the pre-stored authentication information.

It should be noted that the terminal device 400 according to this embodiment may correspond to the terminal device in a control method of a terminal device consistent with the embodiments of the present disclosure. And the foregoing and other operations, and/or functions of the blocks of the terminal device 400 are to realize the corresponding processes of the method as illustrated in relation to FIG. 1, which is not repeated herein.

Figure 5:
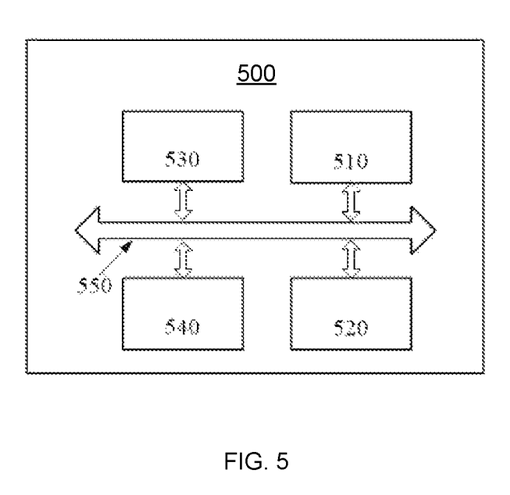
FIG. 5 illustrates a schematic structural diagram of a wearable device according to one embodiment of the present disclosure.

FIG. 5 is a schematic structural diagram of a wearable device according to another embodiment of the present disclosure. As shown in FIG. 5, the wearable device includes a processor 510, a memory 520, a transceiver 530, a sensor 540 and a bus system 550, in which the processor 510, the memory 520, the transceiver 530, the sensor 540 are connected via the bus system 550. The memory 520 is configured to store instructions, while the processor 510 is configured to execute the instructions stored in the memory 520.

The sensor 540 is configured to detect an input. The transceiver 530 is configured to establish a connection with the terminal device, and receive a message transmitted by a terminal device. The message is sent to instruct the wearable device to start detection of an input, or instruct the wearable device to send information for characterizing data detected by the wearable device to the terminal device. The transceiver 530 is further configured to send first information to the terminal device. The first information characterizes the data detected by the sensor 540 so that the terminal device switches a state according to the first information.

In one embodiment of the present disclosure, the wearable device transmits information for characterizing the data detected by the wearable device to the terminal device based on the message sent from the terminal device. The terminal device switches a state according to the information. In such an arrangement, the user does not need to input a predetermined password or unlocking gesture in the terminal device. It does not require the user's finger touching a fingerprint detection area, either. Accordingly, the terminal device can easily carry out a state switch, thereby improving the user's experience.

Optionally, the first information may further include the time at which the wearable device detects an input.

It will be understood that the wearable device 500 according to this embodiment of the present disclosure may correspond to the wearable device in a control method of a terminal device according to the embodiments of the present disclosure. And the foregoing and other operations, and/or functions of the blocks of the wearable device 500 are to realize the corresponding processes of the method as illustrated in relation to FIG. 2, which is not repeated herein.

Figure 6:
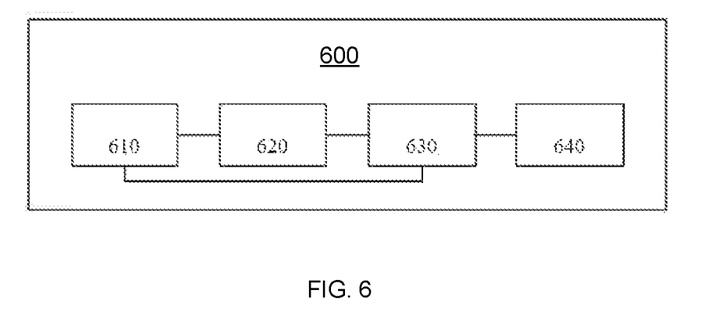
FIG. 6 illustrates a schematic structural diagram of a terminal device according to another embodiment of the present disclosure.

FIG. 6 is a schematic structural view of a terminal device according to still another embodiment of the present disclosure. As shown in FIG. 6, the wearable device 600 includes a detecting unit 610, a receiving unit 620, a determining unit 630, and a switching unit 640.

The detecting unit 610 is configured to detect an input after the terminal device is connected with the wearable device, and the terminal device is in a state.

The receiving unit 620 is configured to receive first information transmitted by the wearable device, and the first information characterizes a first data detected by the wearable device.

The determining unit 630 is configured to determine second information characterizing a first input detected by the detecting unit 610 and determine whether the first information matches the second information.

The switching unit 640 is configured to switch the terminal device to a second state if the first information matches the second information. The terminal device has different authorities to access data in the first state and the second state.

In one embodiment of the present disclosure, the terminal device detects an input after the terminal device is connected with the wearable device and the terminal device is in a first state. And the terminal device receives first information sent by the wearable device, in which the first information characterizes data detected by the wearable device. The terminal device further determines second information characterizing an input detected by the terminal device. If the first information matches the second information, the terminal device switches to a second state. In such an arrangement, the user does not need to input a pre-determined password or unlocking gesture in the terminal device. It does not require the user's finger touching a fingerprint detection area, either. Accordingly, the terminal device can easily carry out a state switch, thereby improving the user's experience.

It should be noted that the terminal device 600 according to this embodiment may correspond to the terminal device in a control method of a terminal device consistent with the embodiments of the present disclosure and the terminal device 400. And the foregoing and other operations, and/or functions of the blocks of the terminal device 600 are to realize the corresponding processes of the method as illustrated in relation to FIG. 1, which is not repeated herein.

Figure 7:
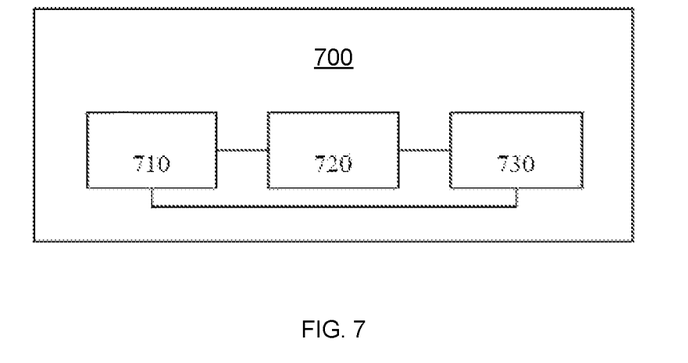
FIG. 7 illustrates a schematic structural diagram of a wearable device according to another embodiment of the present disclosure.

FIG. 7 is a schematic structural view of a wearable device according to another embodiment of the present disclosure. As shown in FIG. 7, the wearable device includes a detecting unit 710, a receiving unit 720, and a transmitting unit 730.

The detecting unit 710 is configured to detect an input.

The receiving unit 720 is configured to receive a message sent by a terminal device, in which the message is sent to instruct the wearable device to start detection of an input, or instruct the wearable device to send to the terminal device information for characterizing data detected by the wearable device.

The transmitting unit 730 is configured to transmit the first information to the terminal device, the first information characterizing the data detected by the detecting unit 710 so that the terminal device switches a state according to the first information.

In the embodiment of the present disclosure, the wearable device transmits information for characterizing the data detected by the wearable device to the terminal device based on the message transmitted from the terminal device so that the terminal device switches a state according to the information. Therefore, the user does not need to input a preset password or an unlocking gesture in the terminal device. And the user's finger does not need to touch the fingerprint detection area, so that the terminal device can easily perform a state switch, thereby improving the user's experience.

It should be noted that the wearable device 700 according to this embodiment may correspond to the wearable device in a control method of a terminal device consistent with the embodiments of the present disclosure and the wearable device 500. And the foregoing and other operations, and/or functions of the blocks of the wearable device 700 are to realize the corresponding processes of the method as illustrated in relation to FIG. 2, which is not repeated herein.

It will be apparent to those skilled in the art that specific processes of the described systems, devices and units described can be referred to the corresponding processes in the foregoing embodiments of the method for the sake of convenience and simplicity of description, and will not be described further herein.

In several embodiments provided herein, it should be understood that the disclosed systems, apparatus, and methods may be implemented in other ways. The embodiment of the device described above is merely illustrative. For example, the division of the units is only a logical function division, and there may be additional ways in an actual implementation. In one instance, multiple units or components may be combined or can be integrated into another system, or some features can be ignored or unexecuted. In addition, coupling, direct coupling or communication connection shown or discussed may be either an indirect coupling or a communication connection through some interfaces, devices or units, in an electrical or mechanical connection.

The units described as separation means may or may not be a physical separation, and the components shown as units may or may not be physical units, i.e., may be located in one place or may be distributed over a plurality of network elements. A part or all of the units may be selected according to actual needs to achieve the objectives of the embodiment of the present disclosure.

In addition, the functional units in the various embodiments of the present disclosure may be integrated in one processing unit, or may be physically separate from each unit, or two or more units may be integrated in one unit.

The integrated unit may be stored in a computer-readable storage medium. The mentioned storage medium may include a variety of media such as a USB disk, a mobile hard disk, a read-only memory, a random-access memory (RAM), a magnetic disk, or an optical disk.

The foregoing is intended to be a specific embodiment of the disclosure, but the scope of the disclosure is not limited thereto. It will be readily apparent to those skilled in the art within the technical scope of the present disclosure to modify or replace. These modifications or substitutions should be covered within the scope of the present disclosure. Accordingly, the protection scope of the present disclosure should be based on the scope of the claims in the following.

What is claimed is:

1. A control method of a terminal device, comprising:
receiving first information transmitted from a wearable device, wherein:
the terminal device coupled to the wearable device is in a first state, the first information is related to data detected by the wearable device and including user parameters of a user using the wearable device, and
the user parameters indicate at least one of heart-beating rates, a gesture of a body part, or a time duration of a human action;
determining second information, the second information being related to a first input detected by the terminal device;
switching the terminal device to a second state if at least a portion of the user parameters characterized by the first information corresponds to the second information; and in response to detecting a second input when the terminal device is not connected with the wearable device, determining a third information, the third information being related to the second input detected by the terminal device; determining whether the third information corresponds to an authentication information, and connecting the terminal device with the wearable device if the third information corresponds to the authentication information,
wherein the data detected by the wearable device and the first input detected by the terminal device are from different types of sensors.

2. The method according to claim 1, further comprising: determining whether the first information including a time at which the wearable device detects the data; and determining whether the time is within a threshold value and whether the action at least a portion of the user parameters characterized by the first information corresponds to the second information.

3. The method according to claim 2, further comprising: determining whether the at least a portion of the user parameters characterized by the first information corresponds to the second information based on a correspondence between the at least a portion of the user parameters of the data detected by the wearable device and the input detected by the terminal device.

4. The method according to claim 1, further comprising: sending a message to the wearable device, wherein the message instructs the wearable device to start a data detection or to send the first information to the terminal device.

5. The method according to claim 1, further comprising: terminating an input detection in response to the terminal device receiving the first information transmitted from the wearable device.

6. A terminal device, comprising: a sensor configured to detect an input after the terminal device establishes a connection with a wearable device, the terminal device coupled to the wearable device being in a first state; a transceiver configured to receive first information transmitted from the wearable device, wherein: the first information is related to data detected by the wearable device and including user parameters of a user using the wearable device, and the user parameters indicate at least one of heart-beating rates, a gesture of a body part, or a time duration of a human action; and a processor configured to: determine second information, the second information being related to the input detected by the terminal device but not being received from the wearable device; determine whether at least a portion of the user parameters characterized by the first information corresponds to the second information; switch the terminal device to a second state if the at least a portion of the user parameters characterized by the first information corresponds to the second information, and in response to detecting a second input when the terminal device is not connected with the wearable device, determine a third information, the third information being related to the second input detected by the terminal device; determine whether the third information corresponds to an authentication information; and connecting the terminal device with the wearable device if the third information corresponds to the authentication information, wherein the data detected by the wearable device and the first input detected by the terminal device are from different types of sensors.

7. The method according to claim 6, wherein the first information further comprises a time at which the wearable device detects the data.

8. A terminal device, comprising:
a sensor configured to detect an input after the terminal device establishes a connection with a wearable device, the terminal device coupled to the wearable device being in a first state;
a transceiver configured to receive first information transmitted from the wearable device, wherein:
the first information is related to data detected by the wearable device and including user parameters of a user using the wearable device, and
the user parameters indicate at least one of heart-beating rates, a gesture of a body part, or a time duration of a human action; and
a processor configured to:
determine second information, the second information being related to the input detected by the terminal device from the wearable device;
determine whether at least a portion of the user parameters characterized by the first information corresponds to the second information;
switch the terminal device to a second state if the at least a portion of the user parameters characterized by the first information corresponds to the second information; and
in response to detecting a second input when the terminal device is not connected with the wearable device,
determine a third information, the third information being related to the second input detected by the terminal device;
determine whether the third information corresponds to an authentication information; and
connecting the terminal device with the wearable device if the third information corresponds to the authentication information.

9. The terminal device according to claim 8, wherein the processor is further configured to determine whether the at least a portion of the user parameters characterized by the first information corresponds to the second information.

10. The terminal device according to claim 8, wherein the sensor of the terminal device is different from a sensor for detecting the data in the wearable device.

11. The terminal device according to claim 8, wherein:
the input is a first input,
the sensor of the terminal device is further configured to detect a second input when the terminal device is not connected with the wearable device, the terminal device being in the first state; and
the processor is further configured to:
determine third information, the third information being related to the second input detected by the sensor;
determine whether the third information matches an authentication information; and
switch the terminal device to the second state if the third information corresponding to the authentication information.

12. The terminal device according to claim 8, wherein the transceiver is further configured to establish a connection with the wearable device.

13. A wearable device, comprising: a sensor configured to detect data; and transceiver configured to receive a message transmitted by a terminal device, the message instructing the wearable device to start a data detection, or to send information for characterizing the data detected by the wearable device to the terminal device, wherein: the transceiver is further configured to send first information to the terminal device coupled to the wearable device, the first information is related to the data detected by the wearable device and including user parameters of a user using the wearable device, the user parameters indicate at least one of heart-beating rates, a gesture of a body part, or a time duration of a human action, and the first information allows the terminal device to be switched to a state if at least a portion of the user parameters characterized by the first information; and in response to detecting a second input in the event the terminal device is not connected with the wearable device, determining a third information, the third information being related to the second input detected by the terminal device; determining whether the third information corresponds to an authentication information; and connecting the wearable device with the terminal device if the third information corresponds to the authentication information, wherein the data detected by the wearable device and the first input detected by the terminal device are from different types of sensors.

14. The wearable device according to claim 13, wherein the transceiver is further configured to establish a connection with the terminal device.

\* \* \* \* \*